United States Patent
Dayama et al.

(10) Patent No.: US 11,928,234 B2
(45) Date of Patent: Mar. 12, 2024

(54) PLATFORM FOR DYNAMIC COLLABORATIVE COMPUTATION WITH CONFIDENTIALITY AND VERIFIABILITY

(71) Applicant: International Business Machines Corporation, Armonk, NY (US)

(72) Inventors: Pankaj Satyanarayan Dayama, Bangalore (IN); Nitin Singh, Bangalore (IN); Dhinakaran Vinayagamurthy, Erode (IN); Santosh Ravi Kiran Penubothula, Vijayawada (IN)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 17/395,646

(22) Filed: Aug. 6, 2021

(65) Prior Publication Data
US 2023/0041073 A1 Feb. 9, 2023

(51) Int. Cl.
*G06F 21/62* (2013.01)
*G06F 21/60* (2013.01)
*G06F 21/64* (2013.01)

(52) U.S. Cl.
CPC ........ *G06F 21/6227* (2013.01); *G06F 21/602* (2013.01); *G06F 21/64* (2013.01)

(58) Field of Classification Search
CPC ..... G06F 21/6227; G06F 21/602; G06F 21/64
See application file for complete search history.

(56) References Cited

U.S. PATENT DOCUMENTS

| | | | |
|---|---|---|---|
| 9,736,128 B2* | 8/2017 | Premnath | H04L 63/062 |
| 2016/0330180 A1* | 11/2016 | Egorov | G09C 1/00 |
| 2018/0096166 A1* | 4/2018 | Rogers | H04L 63/04 |
| 2019/0215159 A1 | 7/2019 | Notani | |

(Continued)

OTHER PUBLICATIONS

Chenyun Dai et al., "An Approach to Evaluate Data Trustworthiness Based on Data Provenance", SDM 2008, LNCS 5159, Aug. 2008, 17 pages, ResearchGate, Springer-Verlag, Berlin Heidelberg.

(Continued)

*Primary Examiner* — Michael R Vaughan
*Assistant Examiner* — Ethan V Vo
(74) *Attorney, Agent, or Firm* — Stephanie L. Carusillo

(57) ABSTRACT

One embodiment provides a method, including: receiving, from a user at a collaboration platform, a request to perform a computation; generating a workflow comprising a sequence of steps for performing the computation; identifying potential data sources comprising the type of data and able to assist in performing at least one of the sequence of steps of the workflow; selecting computation data sources that collaborate to perform the computation, wherein the selecting is performed dynamically and based upon characteristics of a network created by the collaboration platform and between the computation data sources; and facilitating performance of the computation by the computation data sources using data of the computation data sources, wherein during performance of the computation the computation data sources collaborate within the network to perform the workflow while maintaining individual privacy of the data of the computation data sources and providing proof verifying a trustworthiness of the computation.

18 Claims, 6 Drawing Sheets

(56) References Cited

U.S. PATENT DOCUMENTS

| | | | | |
|---|---|---|---|---|
| 2020/0014703 A1* | 1/2020 | Furukawa | ............. | H04L 63/126 |
| 2020/0019720 A1* | 1/2020 | Chasman | ................ | H04L 67/34 |
| 2020/0125741 A1* | 4/2020 | Lin | ......................... | H04L 9/085 |
| 2020/0326937 A1* | 10/2020 | Levin | .................... | G06F 8/4441 |
| 2021/0051008 A1* | 2/2021 | Li | ........................... | G06F 21/71 |
| 2021/0273812 A1* | 9/2021 | Hardin | ................. | H04L 9/0637 |
| 2021/0328798 A1* | 10/2021 | Liu | ........................ | H04L 9/3247 |
| 2021/0373937 A1* | 12/2021 | Veeningen | ........... | G06F 9/5066 |
| 2021/0373940 A1* | 12/2021 | Will | .................... | G06F 21/6218 |
| 2022/0261507 A1* | 8/2022 | Tsuchida | ................ | H04L 9/008 |

OTHER PUBLICATIONS

Rishabh Poddar et al., "Senate: A Maliciously-Secure MPC Platform for Collaborative Analytics", 30th USENIX Security Symposium, Oct. 26, 2020, 18 pages, arXiv:2010.13752v1 [cs.CR], ResearchGate.

Dan Bogdanov et al., "Deploying secure multi-party computation for financial data analysis", International Conference on Financial Cryptography and Data Security, Jan. 2011, 15 pages, Copy available at: https://eprint.iacr.org/2011/662.pdf.

Teresa Tung et al., "Maximize collaboration through secure data sharing", Accenture Applied Intelligence, Oct. 1, 2019, 7 pages, Copy available at: https://www.accenture.com/us-en/insights/digital/maximize-collaboration-secure-data-sharing.

Mukesh Singhal et al., "Collaboration in Multicloud Computing Environments: Framework and Security Issues", Feb. 2013, 9 pages, IEEE Computer Society.

Yanjun Zhang et al., "PrivColl: Practical Privacy-Preserving Collaborative Machine Learning", European Symposium on Research in Computer Security—ESORICS 2020, Jul. 14, 2020, 20 pages, arXiv:2007.06953v1 [cs.CR].

* cited by examiner

- Input data handles: D1, D2, D3
- Out = Avg(D1, D2, D3)

FIG. 2

- Input data handles: D1, D2, D3
- For i ∈ {1,3}
  - Di' = LocalCompute(Di)
  - # The underlying engine generates a derived data handle with a ZK proof
- Out = JointAvg(D1', D2', D3')
- # The underlying engine generates a hash of the output of any Joint computation

FIG. 3

PLATFORM FOR DYNAMIC COLLABORATIVE COMPUTATION WITH CONFIDENTIALITY AND VERIFIABILITY

BACKGROUND

Entities can learn much more information with more data. However, it can be difficult to capture all the information that an entity may want in order to gain the desired insights. Thus, it makes sense for entities to work together and share information gleaned from data of each of the entities to gain more insights than possible using only the data of a single entity. Many entities may agree to collaborate in order to learn additional insights about information. In these collaborations the entities share data in order to perform computations on the data. For example, one entity may perform a portion of the computation using the data of the entity and then pass the result to another of the entities to use in performing another portion of the computation using the result and the data of the other entity. The collaboration allows for more complex analyses on the data since the collaborative system having all the entities have access to much more data than a single one of the entities within the collaboration.

BRIEF SUMMARY

In summary, one aspect of the invention provides a method, including: receiving, from a user at a collaboration platform, a request to perform a computation, wherein the request identifies the computation to be performed and a type of data to be used for the computation, wherein the collaboration platform communicates with a plurality of data sources; generating, at the collaboration platform, a workflow including a sequence of steps for performing the computation; identifying, at the collaboration platform and from the plurality of data sources, potential data sources including the type of data and able to assist in performing at least one of the sequence of steps of the workflow; selecting, at the collaboration platform and from the identified data sources, computation data sources that collaborate to perform the computation, wherein the selecting is performed dynamically and based upon characteristics of a network created by the collaboration platform and between the computation data sources; and facilitating, at the collaboration platform, performance of the computation by the computation data sources using data of the computation data sources, wherein during performance of the computation the computation data sources collaborate within the network to perform the workflow while maintaining individual privacy of the data of the computation data sources and providing proof verifying a trustworthiness of the computation.

Another aspect of the invention provides an apparatus, including: at least one processor; and a computer readable storage medium having computer readable program code embodied therewith and executable by the at least one processor; wherein the computer readable program code is configured to receive, from a user at a collaboration platform, a request to perform a computation, wherein the request identifies the computation to be performed and a type of data to be used for the computation, wherein the collaboration platform communicates with a plurality of data sources; wherein the computer readable program code is configured to generate, at the collaboration platform, a workflow including a sequence of steps for performing the computation; wherein the computer readable program code is configured to identify, at the collaboration platform and from the plurality of data sources, potential data sources including the type of data and able to assist in performing at least one of the sequence of steps of the workflow; wherein the computer readable program code is configured to select, at the collaboration platform and from the identified data sources, computation data sources that collaborate to perform the computation, wherein the selecting is performed dynamically and based upon characteristics of a network created by the collaboration platform and between the computation data sources; and wherein the computer readable program code is configured to facilitate, at the collaboration platform, performance of the computation by the computation data sources using data of the computation data sources, wherein during performance of the computation the computation data sources collaborate within the network to perform the workflow while maintaining individual privacy of the data of the computation data sources and providing proof verifying a trustworthiness of the computation.

An additional aspect of the invention provides a computer program product, including: a computer readable storage medium having computer readable program code embodied therewith, the computer readable program code executable by a processor; wherein the computer readable program code is configured to receive, from a user at a collaboration platform, a request to perform a computation, wherein the request identifies the computation to be performed and a type of data to be used for the computation, wherein the collaboration platform communicates with a plurality of data sources; wherein the computer readable program code is configured to generate, at the collaboration platform, a workflow including a sequence of steps for performing the computation; wherein the computer readable program code is configured to identify, at the collaboration platform and from the plurality of data sources, potential data sources including the type of data and able to assist in performing at least one of the sequence of steps of the workflow; wherein the computer readable program code is configured to select, at the collaboration platform and from the identified data sources, computation data sources that collaborate to perform the computation, wherein the selecting is performed dynamically and based upon characteristics of a network created by the collaboration platform and between the computation data sources; and wherein the computer readable program code is configured to facilitate, at the collaboration platform, performance of the computation by the computation data sources using data of the computation data sources, wherein during performance of the computation the computation data sources collaborate within the network to perform the workflow while maintaining individual privacy of the data of the computation data sources and providing proof verifying a trustworthiness of the computation.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 illustrates an example user specification for a simple joint average collaborative computation.

FIG. 3 illustrates an example generated workflow for a simple joint average collaborative computation.

DETAILED DESCRIPTION

Figure 1:
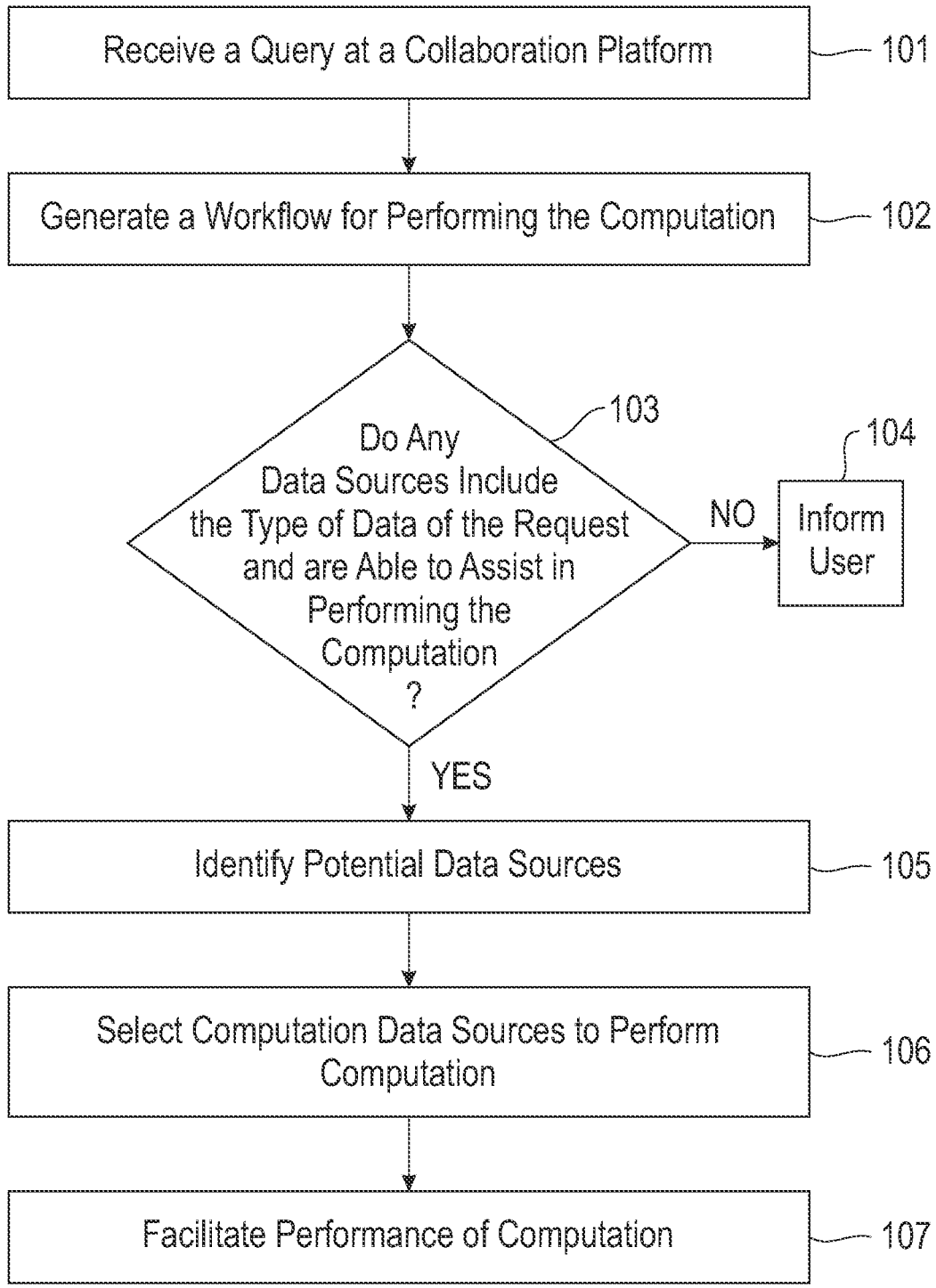
FIG. 1 illustrates a method of using a collaboration platform to facilitate a collaborative computation among a plurality of data sources while maintaining the privacy of the data of the data sources and ensuring a trustworthiness of the computation.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-6. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

One difficulty in entities collaborating to analyze data from across the entities is each of the entities would prefer to keep the underlying or original data private from the other entities and are generally only willing to share the end result of the analysis performed on the data. Another difficulty with the collaboration is that there is not a way to guarantee the trustworthiness of the data or computation steps performed by entities. In other words, entities within the collaboration or a user requesting a computation to be performed are not assured that the end result is actually trustworthy because there is no way to verify that each of the steps is performed accurately and the data used in each of the steps is actually accurate and truthful data.

There are several collaboration platforms that allow for entities to collaborate to perform computations or analyses on data across the entities, also referred to as data sources. However, the traditional collaboration platforms have drawbacks. One drawback is the data sharing access policies are very coarse, meaning the entities cannot fine-tune the sharing policies to keep the data as private as the entity wants. Another drawback is that the platform has to be trusted since the platform gains access to the data of the entities using the collaboration platform. Additionally, the platform has to be trusted with respect to the correctness of the results of the computations. Additionally, there is no technique to verify that the platform is performing as advertised. Other conventional techniques include standalone cryptographic libraries. However, these only perform individual computation workflow steps and are not integrated into complex workflows. Other collaboration platforms allow learning but they are focused on neural network and machine learning building and, therefore, do not support any functionality outside the neural network and machine learning building.

Accordingly, an embodiment provides a system and method for using a collaboration platform to facilitate a collaborative computation among a plurality of data sources while maintaining the privacy of the data of the data sources and ensuring a trustworthiness of the computation. The system, at a collaboration or collaborative platform, receives a request to perform a computation from a user. The request includes information about the computation including the computation to be performed and a type of data to be used for the computation. The request can include additional data, for example, input data, generic parts of the computation, single or multi-party inputs, and the like. The collaboration platform is in communication with a plurality of data sources, each having data that could be used in a computation.

The collaboration platform generates a workflow having a sequence of steps for performing the computation. Each step can be performed by one or more of the data sources using data of the data source. Thus, the collaboration platform identifies data sources from the plurality of data sources that have the data needed for performing one or more steps of the workflow and that are able to assist in performing the computation. Not all data sources that have the correct data are able to assist in performing the computation. For example, the data source may be busy, may have privacy policies that do not work with other of the data sources, or the like. From the potential data sources, the system selects data sources to collaborate to perform the computation, referred to as computation data sources. The selection of the data sources is performed dynamically based upon characteristics of the network of computation data sources. The collaboration platform then facilitates the performance of the computation between the computation data sources. The collaboration platform facilitates the performance of the computation in a manner that maintains the individual privacy of the data of the computation data sources while providing proof that verifies the trustworthiness of the computation steps and the result of the computation.

Such a system provides a technical improvement over current systems for collaborative computation. The described system and method provides a collaboration platform that allows for entities or data sources to collaborate to perform computations using data across the entities or data sources. Unlike conventional systems the described system allows for data sharing access policy tuning by each of entities at a very fine level. Each entity can tune a data sharing access policy based upon different datasets, different collaborators, different computations or workflow steps, or the like, thereby giving the entity fine control over its data in how it is used and how it is shared.

Additionally, the described system provides a technique for keeping data private while still allowing the data to be used in the collaborative computations. Thus, the described system allows for keeping data of an entity as private as the entity would like. Additionally, unlike conventional systems, the described system provides a technique for proving the correctness of a computation step and computation result, thereby ensuring the trustworthiness of the computation and result. Thus, the described system allows for automation of the orchestration of the workflow while providing the correctness guarantee that the computation output is correct while ensuring the privacy of the data used in the collaborative computation, which is not provided using conventional techniques.

FIG. 1 illustrates a method for using a collaboration platform to facilitate a collaborative computation among a plurality of data sources while maintaining the privacy of the data of the data sources and ensuring a trustworthiness of the computation. At 101 the system receives a request from a user to perform a computation. The system includes a collaboration platform that facilitates communication between data sources, each data source having its own data, thereby providing a single end-point for sharing and searching data sources. It should be noted that the platform can interface with any type of data source or any type of platform or application that may host or house a data source. Thus, the described platform is not limited to data sources of a particular type, having a particular programming language or format, being hosted on a particular application or platform, or the like. The collaboration platform allows for sharing and searching for trustworthy data sources, while ensuring privacy of the data of the data sources. Additionally, the collaboration platform provides a correctness guarantee that the output or result of the computation is correct. Thus, the collaboration platform enables participants to dynamically perform computations over their combined data without sharing private data while enabling the to trust the results of the computation. Additionally, the collaboration platform allows data owners, also referred to as data sources, to have control over how their data is used in joint computations.

The collaboration platform receives the request which identifies the computation to be performed and a type of data to be used for the computation. In identifying the type of data to be used, the user may provide input data that has data handles. The data handles are a derivation of the original data, thereby providing a mechanism that keeps the original data private from other entities on the collaboration platform, including those entities that are involved in performing the computation. The data handles, also referred to as a fingerprint, include a hash of the original data and provenance information for the data. The provenance information may include a signature of someone attesting the data, a blockchain transactions, or the like, the provenance information thereby ensuring the trustworthiness of the data. The data handle may also include a description of the data. The description and a schema provide metadata for search indexing. The data handle may also be associated with data sharing policies that identify how data may be shared. Thus, the data handle is an unforgeable fingerprint of data that binds a data-source without revealing the data, which keeps the original data as private as desired by the data owner.

The computation may be any type of computation that can be performed on a dataset, for example, a simple computation of a joint average or a more complicated computation regarding data predictions or machine-learning. These are merely examples and are not intended to limit the scope of this system in any way as any type of computation can be performed using the described system and method. The user may also specify constraints or requirements for the computation. For example, the user may specify that the computation may contain single and/or multi-party gadgets or inputs. For example, the user may specify an optimized routine for a specific function. The user may also specify that a part of the computation is generic, meaning no special optimization may be applied to that part of the computation. Alternatively, the user could specify values between some subset of computations which allows the system to apply some special type of protocol that can work well for the computation. The user can also specify what types of or values within the computation can be shared. For example, the user may indicate that an intermediate value can be shared among all the data sources assisting in performing the function. The user may also specifically tag some values or results as being private. The user may also identify barriers that prevent local computations from crossing the barriers.

From the specified constraints and information received from the user, a computation specification is formed. The computation specification is used by the system in generating the workflow for the computation and also in selecting data sources to be used in performing the computation. The computation consists of a cryptographic specification of the computation. The computation also consists of input data handles that include one or more sets of data-handles that can be specified to be mutually substitutable and may be from multiple parties. Mutually substitutable means that the data can be substituted based upon data availability. In other words, if the data is identified as being substitutable, the collaboration platform is allowed to choose other data in the event that the specified data is unavailable, would be difficult to acquire (e.g., based upon a processing cost, based upon privacy constraints of the data owner, etc.), or some other reason causing the data to be effectively unavailable or undesirable to access or obtain. The computation also consists of privacy specifications which are computation-wide differential privacy guarantees, meaning the privacy specification in the computation identifies privacy guarantees that must be met throughout the entire computation. This may be in addition to any privacy requirements that are specified by the data owner in the individual data handles.

At 102 the collaboration platform generates a workflow that is a sequence of steps for performing the computation. By automating the workflows using the collaboration platform, the clients and/or data sources do not have to deal with the low-level details of setting up libraries, communications, and the like. The collaboration platform may utilize a complier to generate the workflow. In generating the workflow, the system may identify steps from the sequence of steps that can be performed locally and whose correctness can be attested using zero knowledge proof (ZKP) protocols and steps that need to be performed using one or more of the data sources using a multi-party computation (MPC) protocol. In order to ensure the trustworthiness of the computation result, the sequencing includes sequencing different cryptographic protocols to support a computation request, for example, multi-party computations, zero knowledge proofs, and the like. By using the cryptographic protocols, the initial trust that was established via the provenance of the data handle can be propagated throughout the workflow. The use of multiple different cryptographic techniques enables the system to perform efficient computations. Thus, the use of the cryptographic protocols provides a cryptographic guarantee that the computation result is correct and was computed from trustworthy data.

At 103 the system determines if any data sources include the type of data of the request and whether they are able to assist in performing the computation. Determining whether any data sources include the type of data may be done by simply comparing the requested data to identified data types of the data sources. For example, the collaborative platform may have knowledge of the type of data contained within the data sources. Determining whether any data sources include the type of data may be performed by providing a request or query to the data sources identifying the data type necessary for the computation. The collaborative platform may then receive responses from the data sources identifying whether the data source has the requested data type. The collaborative platform may also search for data types against the data handles of the data sources. As mentioned previously, the data handle may include metadata that can be used for searching. Thus, the platform may search this metadata to determine if the data source includes the data type. Since the platform searches this metadata, the platform is able to determine if the data source includes the data type, but is unable to learn information about the underlying or original data, thereby keeping the original data private.

The collaborative platform may also determine if the data source is able to assist in performing the computation. Determining if the data source is able to assist in performing the computation may be done responsive to determining if the data source includes the type of data of the request. Thus, the platform may only determine if a data source is able to assist in the computation if the data source includes the requested data type. The converse may also be true, meaning that the platform may first determine if the data source is able to assist and then determine if the data source has the requested data type. The determination of whether the data source is able to assist in the computation may be performed at the same time that the platform determines if the data source has the requested data type.

Determining if the data source is able to assist in performing the computation may be based upon providing a request to the data sources asking it is available to assist in performing a computation. The determination may additionally or alternatively be made based upon characteristics of the data source, the collaborative platform, and/or characteristics of a network that will be created between the data sources that are ultimately used to perform the computation. Some characteristics may include network bandwidth, latency, complexity of computation, requirements for sub-circuits, depth of circuit representation of computation, and the like. Data sources that fulfill requested requirements or constraints may be preferred by the platform. Additionally, data sources that may allow for quicker computations, that provide more detailed computation results, are easier to communicate with, or the like, may also be preferred by the platform over other data sources.

The determination may also be made based upon a privacy policy of the data source. Each data source can specify its own privacy policy. The privacy policy allows a data owner or data source to specify to what extent information about its data can be revealed and to whom it can be shared. The privacy policies may include access control lists which identify the entities that can access data and what data the identified entity can access. The privacy policies may additionally or alternatively include allowed leakage which identifies how much information regarding the data could be shared. For example, the privacy policy may identify that an average, median, mode, frequency, or the like, of the values within a particular column, row, dataset subset, or the like, could be shared, but the actual values cannot. As another example, the privacy policy may indicate that no information, including derived information, above values can be shared. The privacy policy may also identify that certain entities can perform secret sharing for identified data. The secret sharing would then allow sharing of data between the identified entities. Data sources having more favorable privacy policies towards one another may be preferred within a network because more data could be shared between the data sources, computations could be performed more quickly, and the like.

If the platform determines that there are not any data sources fulfilling the request, for example, no data sources have the requested data type, no data source is available to fulfill the computation request, there are not enough data sources to perform the computation, or the like, the platform may notify or inform the user of such at 104. The user may then refine or modify the computation request, which may then allow the computation request to be performed by the platform.

If, on the other hand, the platform does identify that there are data sources that can fulfill the computation request, the platform may identify potential data sources at 105. These potential data sources may include data sources that both include the requested data type and that are able to assist in performing at least one of the steps of the workflow of the computation. Identifying the potential data sources may include generating a listing of data sources of the entire data source set that include the requested data type and are able to assist in performing at least one of the steps of the workflow as identified at 104. In making this listing, the platform may also note other features of the potential data sources, for example, features of the data sources that may assist in making a selection of the data sources to be used in collaboratively performing the computation.

At 106, the platform may select data sources from the potential data sources to be used in performing the computation. These will be referred to as computation data sources in order to distinguish them from the entire pool of data sources and also from the pool of potential data sources. The computation data sources are the data sources that are selected to be used in performing the computation in a collaborative manner. In selecting the computation data sources, the platform may prefer certain of the potential data sources over other of the potential data sources. As mentioned above, data sources that may be preferred may include those having more favorable privacy policies towards other of the data sources that could be included in the network, those fulfilling more constraints or requirements of the computation request, those that have more datasets that can be used in performing the computation, those that can perform more steps within the computation, those allowing for quicker computations, those providing more detailed computation results, and the like. Other factors may be used in selecting the computation data sources, for example, the user providing the request may have a preference for certain data sources, the platform may have a preference for certain data sources, and the like.

The data sources selected to be included in the computation data sources may be performed dynamically, meaning they may be chosen upon receipt of the request. Thus, two identical requests for the same computation received at different points in time may result in two different sets of computation data sources based upon different factors, for example, characteristics of the network that is created between the computation data sources. Characteristics of the network that may have an effect on the data sources selected as computation data sources include network latency, complexity of the computation, network bandwidth, requirements for sub-circuits, depth of circuit representation of the computation, and the like.

At 107 the platform may facilitate the performance of the computation by the computation data sources using data of the computation data sources. The computation is a collaborative computation where different data sources perform different portions of the workflow. The platform may assign one or more data sources to be used on different steps of the workflow. The platform may include a workflow execution engine that connects to communication modules of the platform that connect to communication modules of the data sources to perform the computation. The system uses different protocols, for example, multi-party computation protocols, zero knowledge proof protocols, and the like, to communicate between the data sources and the platform to execute the workflow of the computation.

The platform may facilitate the execution of the computation in different configurations. As one example configuration, the platform may act as a proxy that proxies communications between the computation data sources. In this configuration, the platform transmits messages between the computation data sources and takes an active role in executing the computation by being a type of mediator between the data sources. In another example configuration, the platform may enable discoverability between the data sources. In this configuration the platform simply provides enough information to the data sources so that the data sources can connect directly to each other and communicate directly between each other. In this configuration, the platform takes a less active role in executing the computation by simply connecting the data sources to each other. As a final example configuration, the platform may outsource the performance of the computation to a plurality of worker nodes. In this configuration, the data sources may share the data with the worker nodes and the worker nodes then perform the computation. In sharing the data with the worker nodes, the data sources will generate secret shares of its data and send it to the worker nodes. Each worker node will get one secret share and will not learn anything about the private data of the data source. The platform acts to select the worker nodes and transmit information between the worker nodes and the data sources.

During performance of the computation, the computation data sources collaborate to perform the workflow of the computation, but while maintaining the privacy of the data of each of the data sources and providing proof verifying a trustworthiness of the computation. Maintaining privacy of the data of each of the data sources means that the data of a single data source is kept private from other data sources used in the collaborative computation and also from the platform to the extent identified by the privacy policy of the data source. In other words, each data source can specify a privacy policy, as described further herein, and the performance of the computation is done in view of these individual privacy policies so that the privacy of the data of each individual data source is kept private to the extent specified by the privacy policy of the data source. Thus, each data source has complete control over what data is shared and not shared. Additionally, the privacy policy enforcement is performed by the data source and not the platform which means that the platform does not have to be made privy to any of the private data.

To maintain the privacy of the data, the system uses the fingerprints of the data instead of the original data to perform the computation. The fingerprint of the data is used to make a commitment of the data in such a way that it does not reveal anything about the data. Additionally, there is a cryptographic binding between the fingerprint and original data. One example of a fingerprint of a dataset is its hash. To perform the computation while maintaining the privacy of the data, the system executes a cryptographic protocol, for example, a secure multi-party computation, between multiple parties involved in the computation. Additionally, the data sources can also specify policies based upon properties of private data of other participants within the network. For example, a data source can specify that its data can only be a maximum or minimum percentage of the data used in the computation. As another example, the data source can specify that certain columns or values of the data of the data source can be used if a certain type of other data from another data source is used within the computation.

Additionally, since the fingerprints include provenance information, for example, a signature of a user, a blockchain transaction, or the like, and this provenance information is propagated through the computation using different cryptographic protocols for the steps of the workflow, the system ensures the trustworthiness of the data and, therefore, the computation result is maintained. To assist in ensuring the trustworthiness of the data, the system may also precompute verifiable derived data handles from the original data. Additionally, or alternatively, the system may also ask the data owner to precompute verifiable derived data handles from the original data. In precomputing the derived data, the system may expect that some workloads require a particular transformation of the original data. Thus, the system can request the data owner to perform these transformations and then feed the derived data to the data sources that would need the transformed data. In order to ensure trustworthiness, the system could perform the transformation and attach a zero-knowledge proof that indicates that the transformation to the derived data was performed correctly without revealing any information regarding the original data. This allows the derived data to be certified because the original data was certified and the conversion function has been certified.

Thus, the system provides a platform that maintains privacy of the data of the data source from both other data sources and the platform itself. The platform cannot learn anything about the data of the data sources and cannot influence the computation itself. Thus, even a malicious server cannot learn information about the data or change the trustworthiness of the computation. The only thing a malicious platform or server could do is deny service to the requesting user or data sources.

Figure 2:
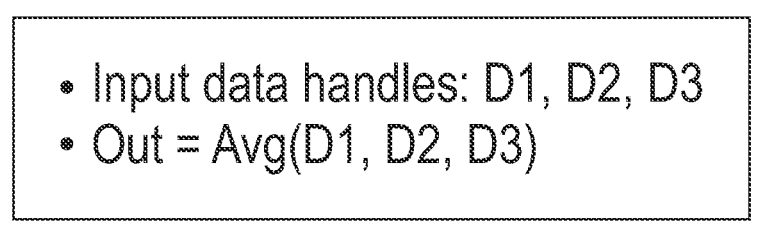
Figure 4:
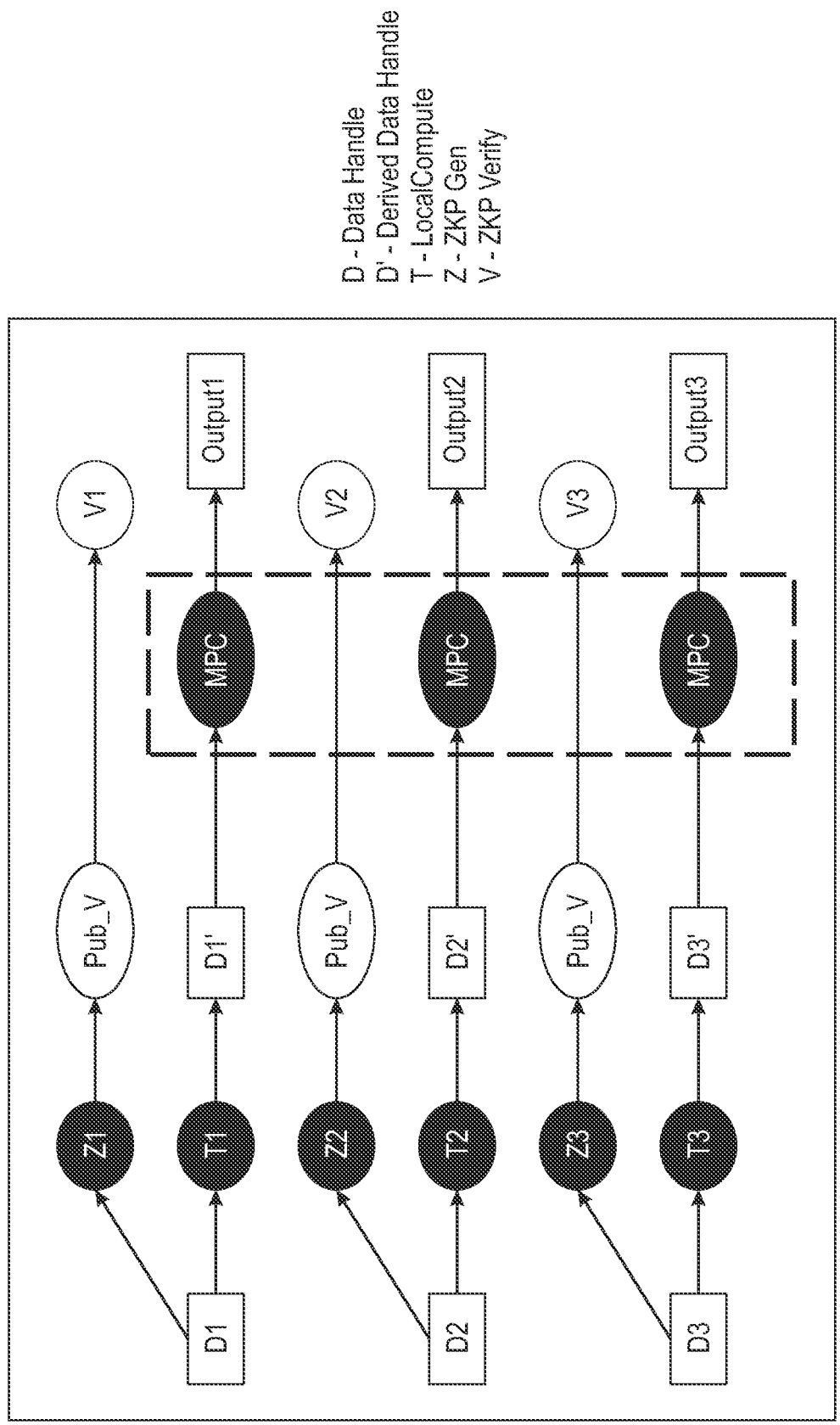
FIG. 4 illustrates an example workflow execution graph for a simple joint average collaborative computation.

FIGS. 2-4 illustrate an example computation facilitated using the described system and method. This example is of a simple joint average computation. FIG. 2 illustrates an example user specification for the computation. In this example, the user has specified the input data handles and the desired computation, in this case, an average of the input data. FIG. 3 illustrates the example workflow generated by the platform. FIG. 4 illustrates an example workflow execution graph which illustrates the steps performed by one or more of the data sources. The execution graph also illustrates the protocols used for performing the steps in order to ensure trustworthiness of the computation result.

Figure 5:
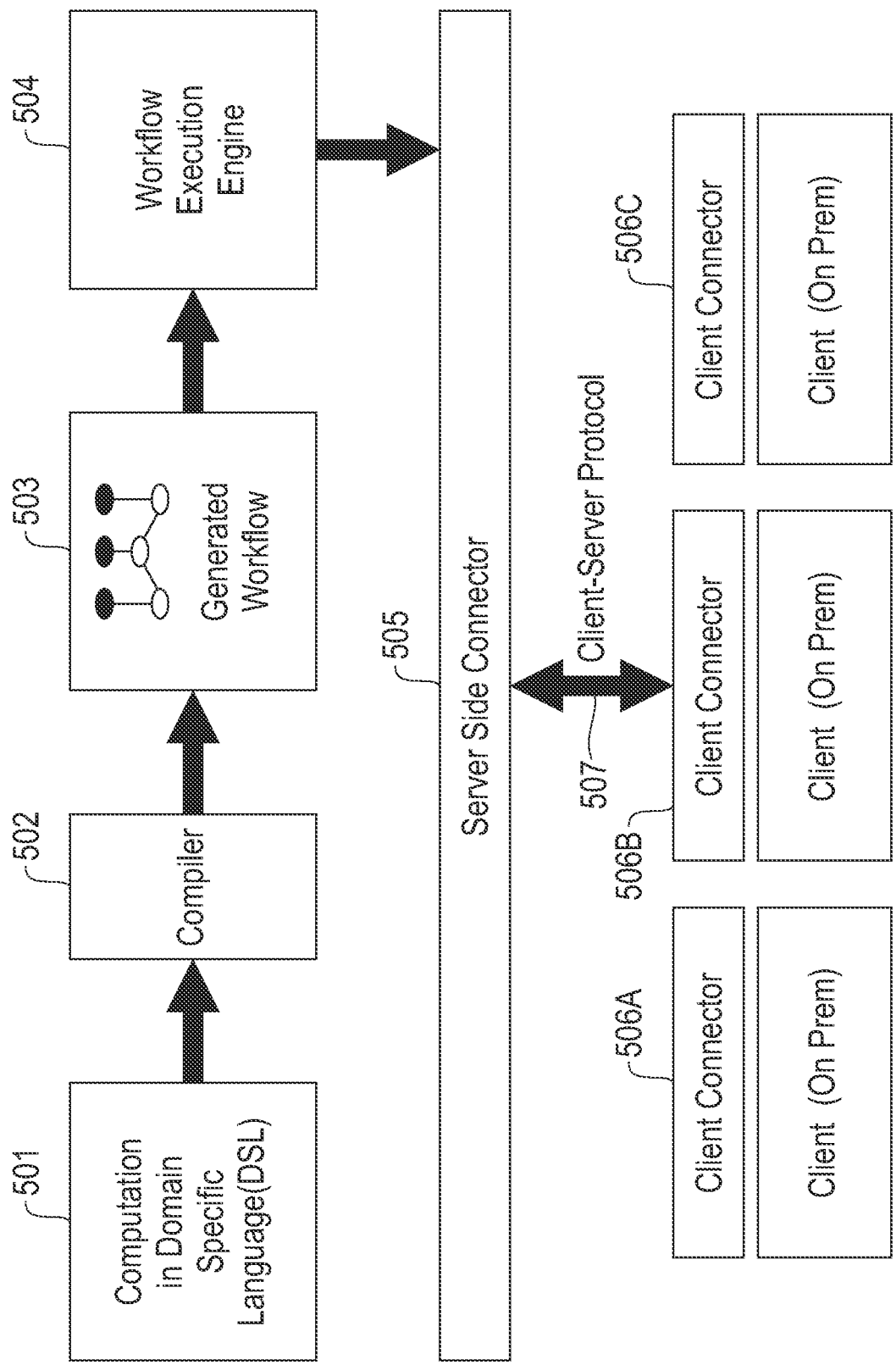
FIG. 5 illustrates an example overall system architecture for using a collaboration platform to facilitate a collaborative computation among a plurality of data sources while maintaining the privacy of the data of the data sources and ensuring a trustworthiness of the computation.

FIG. 5 illustrates an overall example of a system architecture for using a collaboration platform to facilitate a collaborative computation among a plurality of data sources while maintaining the privacy of the data of the data sources and ensuring a trustworthiness of the computation. The system receives a requested computation, for example, in a domain specific language 501. The request is sent to the compiler 502 which generates a workflow for the computation. The generated workflow 503 is passed to the workflow execution engine 504 which communicates with a platform server through a server-side connector 505. The server-side connector 505 communicates with the clients or data sources through a client connector 506A, 506B, and 506C using a client-server protocol. The clients collaborate and communicate with the server to execute the computation workflow and return a result of the computation to the user who specified the computation request 501.

Figure 6:
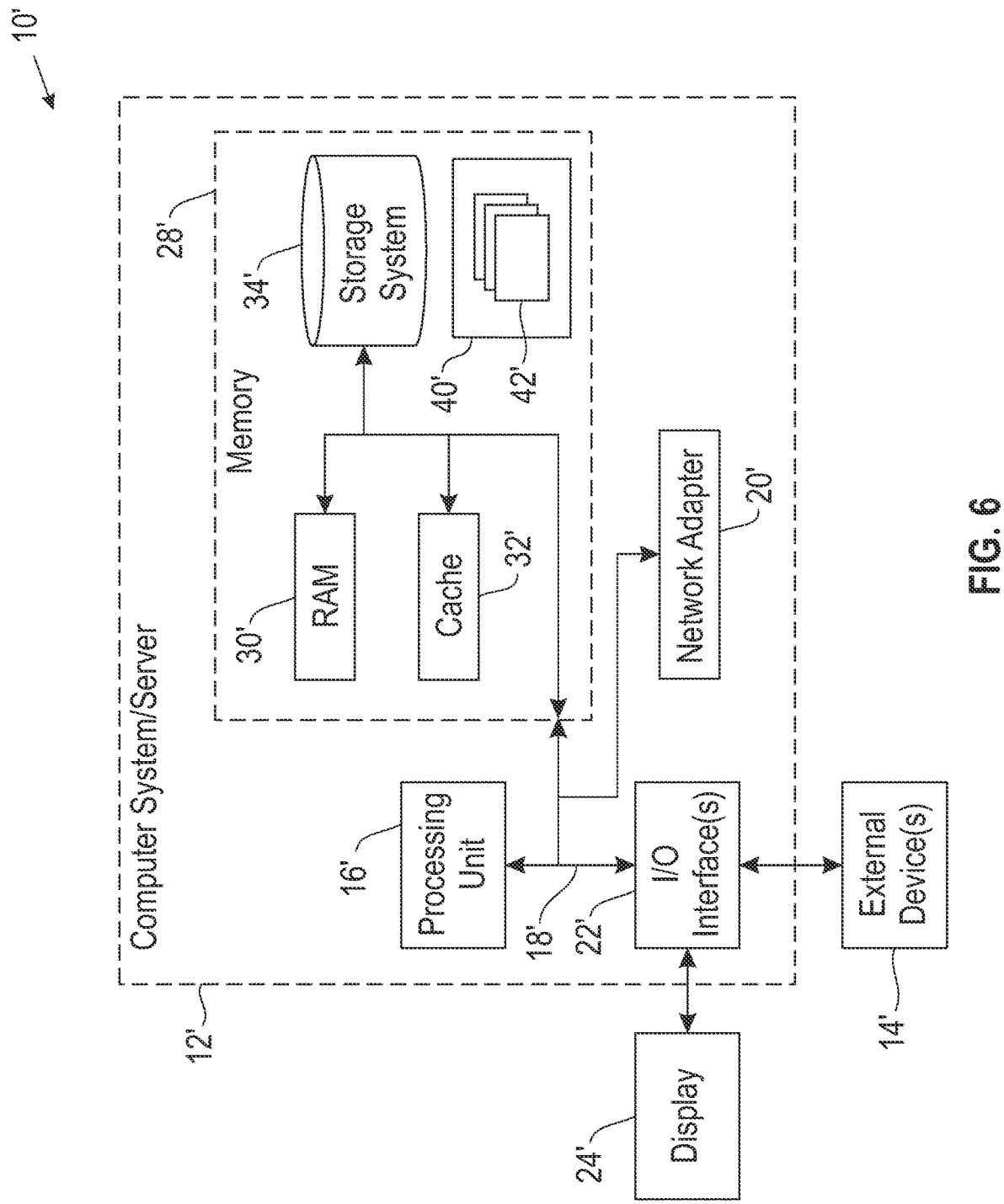
FIG. 6 illustrates a computer system.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, from a user at a collaboration platform, a request to perform a computation, wherein the request identifies the computation to be performed and a type of data to be used for the computation, wherein the type of data is identified by the user providing input data comprising data handles derived from an original format of the input data and comprising provenance information for the input data, wherein the collaboration platform communicates with a plurality of data sources;

forming, from the request and based upon the computation to be performed and the type of data to be used, a computation specification identifying sets of data handles from the data handles, steps for performing the computation on the sets of data handles, and privacy specifications;

generating, at the collaboration platform and based upon the computation specification, a workflow comprising a sequencing of the steps for performing the computation, wherein the generating comprises identifying steps from the sequence of steps to be performed locally and identifying steps from the sequence of steps to be performed using at least one of the plurality of data sources using a multi-party computation protocol, wherein the generating comprises sequencing cryptographic protocols for each of the steps within the sequence of steps;

identifying, at the collaboration platform and from the plurality of data sources, potential data sources comprising the type of data and able to assist in performing at least one of the sequence of steps of the workflow;

selecting, at the collaboration platform and from the identified data sources, computation data sources that collaborate to perform the computation, wherein the selecting is performed dynamically and based upon characteristics of a network created by the collaboration platform and between the computation data sources; and facilitating, at the collaboration platform, performance of the computation by the computation data sources using data of the computation data sources, wherein during performance of the computation the computation data sources collaborate within the network to perform the workflow while maintaining individual privacy of input data via the data handles and the data of the computation data sources and providing proof verifying a trustworthiness of the computation via propagation of the provenance information throughout the computation, wherein the collaboration is facilitated via a workflow execution engine of the collaboration platform that communicates with the computation data sources utilizing different protocols to execute the workflow.

2. The method of claim 1, wherein the steps from the sequence of steps to be performed locally comprises utilizing zero knowledge proofs.

3. The method of claim 1, wherein the maintaining privacy of data comprises generating a fingerprint for the data, wherein the fingerprint is derived from the data.

4. The method of claim 3, wherein the providing proof comprises applying the provenance information to the fingerprint and precomputing verifiable derived data handles from the data, wherein the provenance information comprises an attestation of the data.

5. The method of claim 1, wherein the facilitating comprises the collaboration platform proxying communication between the computation data sources during performance of the workflow.

6. The method of claim 1, wherein the facilitating comprises the collaboration platform enabling direct communication between the computation data sources.

7. The method of claim 1, wherein the facilitating comprises the collaboration platform outsourcing the performance of the computation, using the data of the computation data sources, to a plurality of worker nodes.

8. The method of claim 1, wherein each of the computation data sources specifies at least one privacy policy identifying how data of the corresponding computation data source can be shared with other of the computation data sources and wherein the maintaining privacy is performed in view of the at least one privacy policy of the computation data sources.

9. The method of claim 1, wherein the providing proof comprises utilizing cryptographic protocols while performing at least a subset of the steps of the workflow.

10. An apparatus, comprising:

at least one processor; and a computer readable storage medium having computer readable program code embodied therewith and executable by the at least one processor;

wherein the computer readable program code is configured to receive, from a user at a collaboration platform, a request to perform a computation, wherein the request identifies the computation to be performed and a type of data to be used for the computation, wherein the type of data is identified by the user providing input data comprising data handles derived from an original format of the input data and comprising provenance information for the input data, wherein the collaboration platform communicates with a plurality of data sources;

wherein the computer readable program code is configured to form, from the request and based upon the computation to be performed and the type of data to be used, a computation specification identifying sets of data handles from the data handles, steps for performing the computation on the sets of data handles, and privacy specifications;

wherein the computer readable program code is configured to generate, at the collaboration platform and based upon the computation specification, a workflow comprising a sequencing of the steps for performing the computation, wherein the generating comprises identifying steps from the sequence of steps to be performed locally and identifying steps from the sequence of steps to be performed using at least one of the plurality of data sources using a multi-party computation protocol, wherein the generating comprises sequencing cryptographic protocols for each of the steps within the sequence of steps;

wherein the computer readable program code is configured to identify, at the collaboration platform and from the plurality of data sources, potential data sources comprising the type of data and able to assist in performing at least one of the sequence of steps of the workflow;

wherein the computer readable program code is configured to select, at the collaboration platform and from the identified data sources, computation data sources that collaborate to perform the computation, wherein the selecting is performed dynamically and based upon characteristics of a network created by the collaboration platform and between the computation data sources; and wherein the computer readable program code is configured to facilitate, at the collaboration platform, performance of the computation by the computation data sources using data of the computation data sources, wherein during performance of the computation the computation data sources collaborate within the network to perform the workflow while maintaining individual privacy of input data via the data handles and the data of the computation data sources and providing proof verifying a trustworthiness of the computation via propagation of the provenance information throughout the computation, wherein the collaboration is facilitated via a workflow execution engine of the collaboration platform that communicates with the computation data sources utilizing different protocols to execute the workflow.

11. A computer program product, comprising:
a computer readable storage medium having computer readable program code embodied therewith, the computer readable program code executable by a processor;
wherein the computer readable program code is configured to receive, from a user at a collaboration platform, a request to perform a computation, wherein the request identifies the computation to be performed and a type of data to be used for the computation, wherein the type of data is identified by the user providing input data comprising data handles derived from an original format of the input data and comprising provenance information for the input data, wherein the collaboration platform communicates with a plurality of data sources;
wherein the computer readable program code is configured to form, from the request and based upon the computation to be performed and the type of data to be used, a computation specification identifying sets of data handles from the data handles, steps for performing the computation on the sets of data handles, and privacy specifications;
wherein the computer readable program code is configured to generate, at the collaboration platform and based upon the computation specification, a workflow comprising a sequencing of the steps for performing the computation, wherein the generating comprises identifying steps from the sequence of steps to be performed locally and identifying steps from the sequence of steps to be performed using at least one of the plurality of data sources using a multi-party computation protocol, wherein the generating comprises sequencing cryptographic protocols for each of the steps within the sequence of steps;
wherein the computer readable program code is configured to identify, at the collaboration platform and from the plurality of data sources, potential data sources comprising the type of data and able to assist in performing at least one of the sequence of steps of the workflow;
wherein the computer readable program code is configured to select, at the collaboration platform and from the identified data sources, computation data sources that collaborate to perform the computation, wherein the selecting is performed dynamically and based upon characteristics of a network created by the collaboration platform and between the computation data sources; and
wherein the computer readable program code is configured to facilitate, at the collaboration platform, performance of the computation by the computation data sources using data of the computation data sources, wherein during performance of the computation the computation data sources collaborate within the network to perform the workflow while maintaining individual privacy of input data via the data handles and the data of the computation data sources and providing proof verifying a trustworthiness of the computation via propagation of the provenance information throughout the computation, wherein the collaboration is facilitated via a workflow execution engine of the collaboration platform that communicates with the computation data sources utilizing different protocols to execute the workflow.

12. The computer program product of claim 11, wherein the steps from the sequence of steps to be performed locally comprises utilizing zero knowledge proofs.

13. The computer program product of claim 11, wherein the maintaining privacy of data comprises generating a fingerprint for the data, wherein the fingerprint is derived from the data.

14. The computer program product of claim 13, wherein the providing proof comprises applying the provenance information to the fingerprint and precomputing verifiable derived data handles from the data, wherein the provenance information comprises an attestation of the data.

15. The computer program product of claim 11, wherein the facilitating comprises the collaboration platform proxying communication between the computation data sources during performance of the workflow.

16. The computer program product of claim 11, wherein the facilitating comprises the collaboration platform enabling direct communication between the computation data sources.

17. The computer program product of claim 11, wherein each of the computation data sources specifies at least one privacy policy identifying how data of the corresponding computation data source can be shared with other of the computation data sources and wherein the maintaining privacy is performed in view of the at least one privacy policy of the computation data sources.

18. The computer program product of claim 11, wherein the providing proof comprises utilizing cryptographic protocols while performing at least a subset of the steps of the workflow.

* * * * *